United States Patent Office 3,483,724
Patented Dec. 16, 1969

3,483,724
METHOD OF MAKING A CONSUMABLE ELECTRODE FROM STRIP
Arthur T. Cape, Monterey, Calif., assignor to Coast Metals, Inc., Little Ferry, N.J., a corporation of Delaware
No Drawing. Filed Sept. 7, 1967, Ser. No. 665,968
Int. Cl. B21c 37/06
U.S. Cl. 72—368                    3 Claims

ABSTRACT OF THE DISCLOSURE

The invention relates to a method of making a consumable electrode from strip of difficultly-workable metals and alloys, which is characterized by the fact that the strip is formed into a tube having a longitudinal seam formed by the edges of the strip, and the tube is drawn through a series of dies of gradually diminishing orifice diameter which causes the metal of the tube at one side of the seam to slide over and be wrapped around the metal of the tube at the other side of the seam so that a consumable electrode is ultimately formed in which the original strip becomes spiral-shaped in cross-section, and a hole of substantially circular but irregular cross-section extends through the electrode.

---

In the production of inhomogeneous welding rods, ductile cobalt strip has been rolled into a tube which is filled with metal and ceramic powders to give a composite rod of a given composition (Properties and Applications of Cobalt Strip, by Robert W. Fraser, David J. I. Evans and Vladimir N. Mackiw, Metal Progress, July 1964, pp. 80–84).

The making of such composite welding rods from cold-formable cobalt and cobalt-base alloys is also described in Faulkner Patent 3,091,022.

In certain automatic arc welding processes, such, for example, as that described in Arnoldy Patents 3,060,307, and 3,260,834, controlled quantities of granular alloying elements or welding composition and a consumable wire electrode are deposited on a material which is to be fusion welded or coated with a weld surfacing, the feeding of the wire electrode and the feeding of the granular alloying elements or welding composition being coordinated.

The wire electrode is usually a mild steel wire, since such wire is flexible, is easily uncoiled from a reel of wire and fed to the arc, and is relatively inexpensive.

Use of steel wire, however, imposes a limitation on the scope of alloys which can be deposited in this manner, since the alloys must necessarily comprise substantial quantities of iron.

In depositing cobalt-base alloys of the Stellite type by the Arnoldy process, it would be desirable to use a wire electrode of cobalt, but the cost of cobalt wire made by methods currently used for making such wire is so great as to virtually prohibit the use of such wire in such welding methods. Part of this cost can be attributed to the fact that cobalt, as well as certain other metals and alloys, are materials which are extremely difficult to work, and have a tendency to work harden.

I have found that a consumable cobalt electrode may be made by a method which I have developed, and which enables the cost of the electrode to be reduced substantially and to a point at which it can be used in the Arnoldy process for laying down Stellite type compositions.

The method, in brief, comprises taking cobalt strip of predetermined width and thickness, forming the strip as, for example, by means of a standard Yoder tube-forming machine, into tubing having a longitudinal seam formed by the edges of the strip, and then drawing the tube through a series of dies of gradually diminishing orifice diameter, which causes the metal of the tube at one side of the seam to slide over and be wrapped around the metal at the other side of the seam so that a consumable electrode is ultimately formed in which the original strip becomes spiral-shaped in cross-section, and a hole of substantially circular but irregular cross-section extends through the electrode.

In some cases, the aforesaid operation is continued until the hole is closed, and a slight fissure is formed which extends through the electrode, providing, in effect, a consumable wire electrode.

The extent of reduction in diameter with each draw is so small that work hardening of the product is avoided, and annealing of the product is reduced to a minimum.

As an example of the method, I take cobalt strip of a width of .524″ and having a thickness of 0.20″, and form it into a tube having an O.D. of .156″ by means of a standard Yoder tube-forming machine.

The tube is then drawn through a series of dies which reduces the O.D. of the tube by very small amounts, as follows: .145″, .135″, .125″, .118″, .107″, .100″, .095″, .090″, .087″, .084″, .080″, .075″, .072″.

When the O.D. has been reduced to .072″, the tubing is annealed at about 1800° F. for about 10 minutes in an atmosphere of dissociated ammonia.

Following this anneal, the tube is reduced successively to the following O.D.s: .065″, .060″, .055″, .050″, .045″.

When the O.D. has been reduced to .045″, the tubing is again annealed at about 1800° F. for about 10 minutes in an atmosphere of dissociated ammonia, after which the product is given a final draw to .040″ O.D.

Examination of the tube which is formed by the foregoing procedure reveals the fact that the tube is of spiral-shaped cross-section, and that the passageway or hole therethrough, while of substantially round cross-section, is somewhat irregular in cross-section, and that the product, while tubular, has properties usually associated with a solid wire consumable electrode, that is to say, it is flexible, easily uncoiled from a reel thereof, and fed to the arc, as in the Arnoldy process, to become the base of a Stellite-type alloy.

The consumable electrode may, of course, be used for making cobalt-base alloys of other types by the Arnoldy process, as well as for making alloys of which cobalt is not the base component, but is present in a substantial amount in the alloy.

The method is also applicable to the making of a consumable electrode from strip of other alloys which are difficult to work or work harden rapidly. Such alloys are alloys of the type disclosed in my U.S. Patents Nos. 3,124,451; 3,133,347; 3,197,859; 3,198,609 and 3,316,086.

One of these alloys, known as Coast Metals 1600N, consists of 51% copper, 35% managanese, 9% nickel and 5% cobalt.

Using a strip of 1600N of, a width of .45″ and a thickness of .008″, I form the strip into a tube having an O.D. of .125″, by means of a standard Yoder tube-forming machine.

The tube is then drawn through a series of dies which reduces the O.D. of the tube by very small amounts, as follows: .115″, .107″, .100″, .095″, .090″, .087″, .084″, .080″, .078″, .075″, .072″, .070″, .068″, .065″, .062″, .060″, .058″, .056″, .054″, .052″, .050″, .048″, .046″, .044″, .042″, .040″, the tube being annealed after every two passes at about 1800° F. for about 10 minutes in an atmosphere of dissociated ammonia, or preferably, hydrogen.

When the O.D. has been reduced to .040″, examination of the product which is formed by this procedure shows that the tube is of spiral-shaped cross-section and that the passageway or hole therethrough, while of substantially round cross-section, is somewhat irregular in cross-section, and that the product, while tubular, has properties usually associated with a solid wire consumable electrode, that is to say, it is flexible, easily uncoiled from a reel thereof, and fed to the arc, as in the Arnoldy process, to become the base of an alloy containing copper, manganese, nickel and cobalt.

A particular advantage of the method as described resides in the fact it enables a strip of metal of a predetermined width to be formed into a tubular electrode of various external and internal diameters, since the passes through the dies may be discontinued after the electrode has attained the desired external and internal diameter.

Using a consumable electrode of ⅛" diameter made in this manner, it is possible to deposit a Stellite composition at the rate of 40 pounds per hour, at 625 amperes. Using two such wires, of the same size or even smaller, the deposition rate was increased to nearly 100 pounds per hour.

The method is also applicable to the making of a consumable electrode from nickel strip, for although nickel is a metal workable with less difficulty than cobalt, it becomes feasible to use the method for nickel, because the cost of making such an electrode of nickel is considerably less than making it by any other method presently available.

Where a passageway or hole is left in the consumable electrode made by this method, such passageway or hole may be filled with powdered metals and/or flux, providing, in effect, a filled tube for use in arc welding.

It will be understood that slight changes may be made in the method or product which has been described, without departing from the spirit of the invention or the scope of the subjoined claims.

Having thus described my invention, I claim:

1. The method of making a consumable electrode from metals and alloys which are difficult to work and selected from the group consisting of cobalt, predominantly cobalt alloys, nickel, nickel alloys, copper-base alloys containing substantial amounts of manganese, and manganese-base alloys, said method comprising the steps of forming a strip of such metal or alloy into a tube having a longitudinal seam formed by the edges of the strip, and then drawing the tube through a series of dies of gradually diminishing orifice diameter to thereby cause the metal at one side of the seam to slide over and be wrapped around the metal of the tube at the other side of the seam, annealing the tube at predetermined stages in its reduction in diameter and continuing the drawing until an electrode of predetermined very small diameter and of spiral-shaped cross-section is formed and forming said electrode into a coil.

2. The method, as defined in claim 1, wherein the reduction is carried to a point at which the electrode is virtually a flexible wire.

3. A consumable electrode comprising a tubular element formed of a strip of difficultly workable metal selected from the group consisting of cobalt, predominantly cobalt alloys, nickel, nickel alloys, copper-base alloys containing substantial amounts of manganese, and manganese-base alloys, said electrode being of very small diameter and flexible, coiled into a cross-section of spiral form, and having a passageway therethrough of irregular cross-section.

References Cited

UNITED STATES PATENTS

| | | | |
|---|---|---|---|
| 1,629,748 | 5/1927 | Stoody | 219—146 |
| 1,709,474 | 4/1929 | Hawley | 219—146 |
| 2,909,778 | 10/1959 | Landis et al. | 219—146 |
| 2,998,047 | 8/1961 | Mally et al. | 72—368 |

CHARLES W. LANHAM, Primary Examiner

LOWELL A. LARSON, Assistant Examiner

U.S. Cl. X.R.

214—145